(12) United States Patent
Bouchôou et al.

(10) Patent No.: US 11,668,092 B2
(45) Date of Patent: Jun. 6, 2023

(54) CONSTRUCTION ELEMENT WITH PRE-PRESSED BOARDS

(71) Applicant: LEKO LABS SA, Luxembourg (LU)

(72) Inventors: Jeanne Bouchôou, La Garde (FR); François-Xavier Cordier, Metz (FR); Gael Defer, Bocquegney (FR)

(*) Notice: Subject to any disclaimer, the term of this patent is extended or adjusted under 35 U.S.C. 154(b) by 355 days.

(21) Appl. No.: 16/635,345

(22) PCT Filed: Aug. 3, 2018

(86) PCT No.: PCT/EP2018/071166
§ 371 (c)(1),
(2) Date: Jan. 30, 2020

(87) PCT Pub. No.: WO2019/025605
PCT Pub. Date: Feb. 7, 2019

(65) Prior Publication Data
US 2020/0370298 A1 Nov. 26, 2020

(30) Foreign Application Priority Data
Aug. 3, 2017 (FR) .................................... 1757473

(51) Int. Cl.
*E04C 2/42* (2006.01)
*E04C 2/12* (2006.01)
(Continued)

(52) U.S. Cl.
CPC ............ *E04C 2/422* (2013.01); *B27M 1/003* (2013.01); *B27M 1/02* (2013.01); *B27M 3/004* (2013.01);
(Continued)

(58) Field of Classification Search
CPC . E04C 2/422; E04C 2/12; E04C 2/322; F16B 5/0088; E04B 1/10; B27M 1/003;
(Continued)

(56) References Cited

U.S. PATENT DOCUMENTS

| 1,289,147 A | * | 12/1918 | Forssell | F16B 15/0046 |
| | | | | 403/283 |
| 2010/0071313 A1 | * | 3/2010 | Zuber | B65D 9/34 |
| | | | | 52/745.21 |

FOREIGN PATENT DOCUMENTS

| DE | 103 59 995 B3 | 6/2005 | |
| DE | 10359995 B3 | * 6/2005 | ............. E04B 2/702 |

(Continued)

OTHER PUBLICATIONS

FR 2737745; Mathis Paul Henri; Assembly of building framework wooden pieces—consists in providing pieces along all height of their contact faces with interlocking tenons and mortises or dovetails; EPO English Machine Translation; pp. 1-3 (Year: 2022).*

(Continued)

*Primary Examiner* — Bayan Salone
(74) *Attorney, Agent, or Firm* — Amardeep S. Grewal; William Salinger; Reed Smith LLP (57) ABSTRACT

A construction element includes superposed wooden structural boards that are provided with grooved patterns at the contact interface between the boards in order to prevent the first board and the second board from sliding relative to each other along at least one axis. The construction element further includes a retention system for retaining the boards against each other at the contact interface. The grooved patterns are pre-pressed against each other and the retention system includes at least one metal threaded rod component at least partially passing through at least two of the wooden structural boards at the contact interface.

15 Claims, 8 Drawing Sheets

(51) Int. Cl.
    *E04C 2/32*     (2006.01)
    *E04B 1/10*     (2006.01)
    *B27M 1/00*     (2006.01)
    *B27M 1/02*     (2006.01)
    *B27M 3/00*     (2006.01)
    *F16B 5/00*     (2006.01)

(52) U.S. Cl.
    CPC ............. *B27M 3/0073* (2013.01); *E04B 1/10* (2013.01); *E04C 2/12* (2013.01); *E04C 2/322* (2013.01); *F16B 5/0088* (2013.01); *Y10T 29/49964* (2015.01)

(58) Field of Classification Search
    CPC ...... B27M 1/02; B27M 3/004; B27M 3/0073; Y10T 29/49964
    See application file for complete search history.

(56) References Cited

FOREIGN PATENT DOCUMENTS

| | | | | |
|---|---|---|---|---|
| FR | 2 737 745 A3 | 2/1997 | | |
| FR | 2737745 A3 * | 2/1997 | ........... | E04B 1/2604 |
| FR | 3 056 997 A1 | 4/2018 | | |
| FR | 3056997 A1 * | 4/2018 | ........... | B27M 3/006 |
| WO | WO-0209601 A2 * | 2/2002 | ......... | A61B 17/8635 |
| WO | WO 2008/086636 A1 | 7/2008 | | |
| WO | WO-2008086636 A1 * | 7/2008 | ............... | B65D 9/06 |
| WO | WO 2018/065729 A1 | 4/2018 | | |
| WO | WO-2018065729 A1 * | 4/2018 | ........... | B27M 3/006 |

OTHER PUBLICATIONS

International Search Report, issued in PCT/EP2018/071166, dated Sep. 10, 2018.

* cited by examiner

CONSTRUCTION ELEMENT WITH PRE-PRESSED BOARDS

The present invention relates to the field of construction systems intended for constructing elements made from timber such as dwellings or small multi-occupancy buildings.

Various techniques are now known for designing and fabricating construction systems from timber construction elements.

"Construction element" means any type of element able to equip a construction system, whether or not it be load bearing, for example, non-limitatively, a panel, a partition, a stanchion, a beam or a window.

According to one of the known techniques, a construction element may be formed by a set of plies (or layers) placed one on top of the other.

In a first configuration, each ply comprises a wooden structural board—or a plurality of wooden structural boards parallel to each other—and the successive plies go into abutment against each other.

In a second configuration, referred to as CLT (cross-laminated timber), in each ply, the structural timber boards are disposed one after the other and are parallel to each other. In addition, the plies are arranged, with respect to each other, so that the boards of one ply are orthogonal to the boards of an adjacent ply.

In each of these configurations, the structural boards of a first ply are juxtaposed with the structural boards of a second ply, adjacent to the first ply, and are held against each other. In this configuration, a face of a board of the first ply and a face of a board of the second ply are thus in contact at a plane forming a contact interface.

In order to improve the locking of the structural boards in the plane of the contact interface, disposing a set of patterns, for example grooved patterns, on the faces of the structural boards thus in contact is also known. These patterns may be arranged so that the respective patterns of the faces of the boards in contact cooperate and form an obstacle to the sliding of these boards with respect to each other in the plane of their contact interface. This locking is all the better in the case where the grooved patterns have at least substantially complementary shapes.

In this latter configuration, it is important to hold the structural boards of the adjacent plies against one another along the axis orthogonal to the plane of the boards (which is also the plane of the contact interface between the boards) by means of one or more holding systems.

One of the main challenges of this system is not only to best hold the structural boards against each other but also to allow good transmission and good absorption of the forces transmitted by the boards by applying a compression force locally on the assembly.

In this context, a "local compression" force is spoken of to designate a force that is exerted along the axis orthogonal to the plane of the boards, as well as a "shear" force for designating a force that is exerted in the plane of the boards (which is also the plane of the contact interface between the boards).

The absorption—or transmission—of the forces from one board to another makes it possible to ensure high mechanical strength for the assembly and to combat the natural movement of the grooved patterns that separate the boards from one another. It is therefore desirable for the holding system to allow such a transmission of the forces.

Moreover, although the grooved patterns are complementary, these in practice never fit together perfectly and therefore generally leave a space between the boards at the contact interface, which is unfavourable for absorption of the forces by friction of the grooved pattern surfaces.

A first known holding system consists of a layer of glue at the contact interface. The glue does however have several drawbacks. Firstly, its ecological impact is particularly detrimental and it is therefore necessary to limit the quantity of glue used. Secondly, glue does not favour mass production, in particular since it requires a long pressing and drying time. Thirdly, glue may be prejudicial from the point of view of seismic resistance, since the glued assemblies have no plasticity and would therefore rupture abruptly in the event of excessive stresses.

By way of alternative, holding systems with no glue are also known. A first category of non-gluing systems comprises members of the pin, ring or cramp type and members of the spike or staple type. Nevertheless, the geometry of these members does not offer high resistance to pulling away in order to combat against the traction induced between the holding systems and the wood of the boards because of the natural sliding of the grooved patterns.

A second category of non-gluing systems includes members of the rod type provided with a thread, in particular bolts and screws. Bolts are however unsuited to industrial production, since they require a preliminary piercing step and a space for the nuts. In addition, they involve clearance around their bodies, which does not allow the absorption of tensile forces except at the location of the nut.

In particular, no known holding system truly takes account of the grooved patterns to allow suitable transmission of the forces between two structural boards placed one on the other.

The aim of the present invention is therefore, in a construction element composed of superimposed wooden structural boards and provided with grooved patterns, to improve the transmission of forces between the boards and therefore to improve the mechanical strength of the construction element thus made up.

For this purpose, the subject matter of the present invention is a construction element comprising at least two wooden structural boards arranged so that a face of the first board and a face of the second board are superimposed at a contact interface, the superimposed faces being at least partially provided with a set of grooved patterns at the contact interface, the patterns having shapes at least substantially complementary and being arranged so as to form an obstacle to the sliding of the first board and second board with respect to one another along at least one axis, and at least one holding system arranged so as to hold at least two boards one against the other at the contact interface. According to the invention, the grooved patterns of the superimposed faces are pre-pressed against one another, and the holding system comprises at least one member with a metal threaded rod passing—at least partially—through at least two of the wooden structural boards at the contact interface.

By virtue of the configuration of the construction element, the grooved patterns are pressed against one another before being held together by the holding system. This prior abutment makes it possible to make the grooved patterns fit more precisely in one another and improves the transmission of forces and the mechanical strength of the assembly. In addition, when the pressure applied in advance on the boards exceeds a certain threshold, the grooved patterns may be slightly deformed, which also participates in the putting in contact and the cooperation of the grooved patterns and, in doing this, the transmission of forces. In addition, this putting in prior contact makes it possible to position the boards with respect to one another with greater precision before proceeding with the holding thereof together, which improves all the more the cooperation of the boards and grooved patterns with one another.

In addition, the invention makes it possible to benefit from other advantages afforded among other things by the metal threaded-rod members, in particular the speed of penetration thereof in the wooden structural boards, as well as the high resistance to pulling away in the wood from which these members benefit. The holding can therefore be ensured more easily, with greater reliability, and minimising the risk of splitting the wood.

Furthermore, the present invention makes it possible to benefit from the grooved patterns by avoiding the use of glue at the contact interface. The construction element thus formed therefore avoids using—or at the very least uses little—glue. As a result all the aforementioned problems related to glue can be surmounted.

In addition, by favouring assembly by grooved patterns, the invention makes the use of wood from broad-leaved trees to form the structural boards advantageous. This is because wood is generally classified in two categories: resinous wood and wood from broad-leaved trees. Resinous wood is generally preferred to wood from broad-leaved trees for its lower cost and its ease of drying in the construction field. Wood from broad-leaved trees has greater density. Since the quality and machinability of the grooved patterns is related directly to the density and local mechanical strength of the wood fibre, this is facilitated with wood from broad-leaved trees, whatever the visual appearance and quality of the original wood.

Preferably, the grooved patterns are arranged so as to form an obstacle to the sliding of the first board and second board with respect to one another along at least two non-parallel axes. Locking is thus ensured in the whole of the plane of the contact interface.

Preferably again, the grooved patterns comprise a first series of grooves parallel to each other and a second series of grooves parallel to each other but not parallel to the grooves in the first series. The grooved patterns are then in the form of spikes (the ends of which may or may not be sharp depending in particular on the production conditions).

Preferably again, at least some of the grooved patterns are in the form of a matrix of barbs, the shapes of which are substantially those of a pyramid with a quadrilateral base. This form of pattern proves to be easier to machine.

In a particular embodiment, the member comprises a threaded rod provided with a head and a spike, disposed at opposite ends of the rod.

This head is larger than the diameter of the body of the screw, its dimension results from a compromise between a small dimension for ruining the fewest possible grooved patterns and a dimension sufficient to create thereon a standard impression allowing sufficient coupling at the moment of insertion. This is because, when the screw is inserted, the impression undergoes a certain torque (or force) that will make it possible to penetrate the material. The form of this impression is the TORX standard, related to the diameter of the head; it is selected to correspond to the torque necessary but also in order to reduce the risk of ejection of the tool when the screw is inserted. The spike allows a pre-piercing effect ("self-tapping" screw) and reduces the risk of splitting of the wood at the time of insertion.

Preferably, the member has a roughly cylindrical shape.

In a preferred embodiment, the rod of the member comprises at least two interleaved threads with different diameters. The conventional characteristics of a thread are its pitch and its diameter. The greater the pitch of the thread, the higher the speed of penetration in the wood. The larger the diameter of the thread, the more it locally works the wood in shearing. Consequently, by providing two threads of different diameters, the local working of the wood is provided in two different shear planes, which has the effect of increasing the mechanical strength of the assembly and reducing the time of penetration of the screw through the size of the pitch of the screw related to the existence of two threads.

Preferably, the ratio between the diameter of the widest thread and the diameter of the rods is between 1.5 and 1.7. This ratio is identified as particularly suited to the use of boards made from wood from broad-leaved trees.

Preferably, the holding system comprises four members with a metal threaded rod distributed over the whole of the contact surface and passing at least partially through at least two of said wooden structural boards at the contact interface, which makes it possible to cover the greatest possible surface area of the contact interface with a minimum of members (the greater the number of members passing through the grooved patterns, the less grooved patterns remain for providing the locking in the plane of the contact interface).

In one embodiment, the distance that separates at least one of the threaded-rod members from the edge of the contact interface is between 1.5 and 4 centimetres. The holding system in question is thus placed on the peripheral part of the contact interface, that is to say at the point where the forces are the greatest when the assembly is subject to a moment and so as to firmly place the entire surface.

In the case where the construction element comprises at least three wooden structural boards, at least some of the faces of which are superimposed in pairs at respective contact interfaces, preferably, the holding system comprises a first set of metal threaded-rod members at least partially passing through a first part of the boards and a second set of metal threaded-rod members at least partially passing through a second part of the boards, the first and second board parts having at least one board in common, the members being offset from each other in the planes of the contact interfaces of the boards. This configuration makes it possible to avoid a single member having to pass through the thickness of all the boards, which would require increasing the diameter of the members and reducing the precision of the assembly. Since the members pass through two thicknesses, it is necessary to avoid a collision between the members. In addition, for reasons of symmetry, the positioning of the second member is identical to that of the first member after a rotation of 90° with respect to the centre of the holding system. This configuration makes it possible to pass through the entire thickness of the construction element by overlapping a set of members for two or more boards, because of the dimensions of the members.

In addition, the length of at least one of the metal threaded-rod members is substantially equal to the total thickness of the board part that it is intended to hold together. Consequently, the rod and the thread penetrate the boards over the entire thickness thereof, which increases the proportion of material acted on and improves the resistance to pulling away of the rod in the wood and therefore the maintenance of the pre-stressing of the grooved patterns.

Preferably, at least one of the metal threaded-rod members is positioned in a hollow of the grooved patterns (that is to say at the bottom end that surrounds each pattern and connects the patterns together), which facilitates the penetration of the member.

Preferably, the grooved patterns of the superimposed faces are pre-pressed against each other with a pressure of at least 75 kPa.

The invention further proposes improving the arrangement of the holding system or systems vis-à-vis the structural boards. In this context, the diameter of at least one of the members is configured to cover no more than four grooved patterns. The system thus damages the fewest grooved patterns possible.

The present invention also relates to a method for manufacturing a construction element as described above, comprising in particular the following steps:

the superimposition of the structural boards so that the grooved patterns of the machined faces are in contact with each other at the contact interface;

the putting of the structural boards under pressure against each other with a pressure of at least 30 kPa; and the holding of the structural boards together by a holding system comprising at least one metal threaded-rod member at least partially passing through at least two of the wooden structural boards at the contact interface.

Preferably, the putting of the structural boards under pressure against each other is achieved with a pressure of at least 75 kPa.

In this manufacturing method, preferably, prior to the superimposition thereof, the faces of the structural boards intended to be superimposed are machined so as to provide them with grooved patterns.

The present invention also relates to a construction system comprising at least two construction elements, at least one of which is as described above.

Other features and advantages of the invention will emerge from a reading of the following description of embodiments of the invention, given by way of example and with reference to the accompanying drawings.

Figure 1:
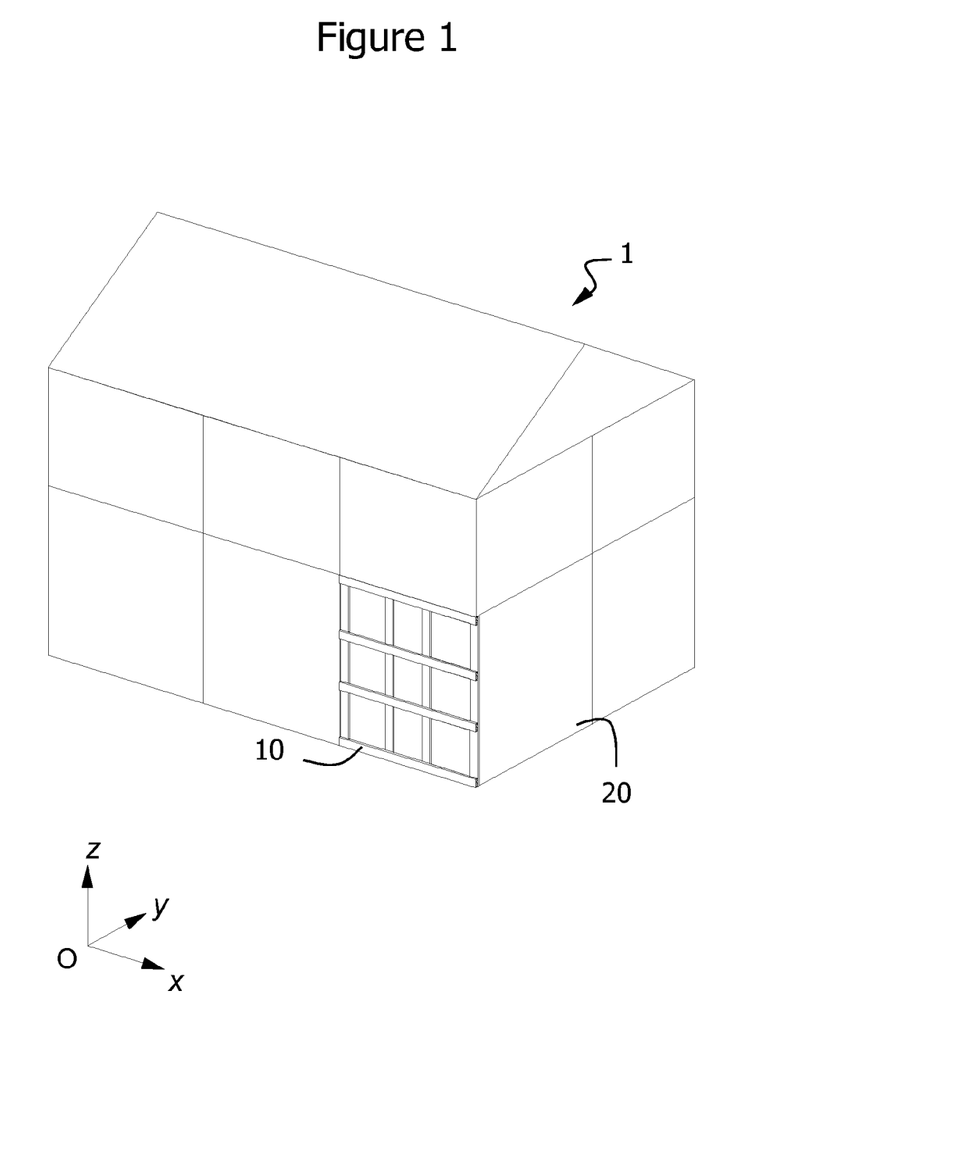
FIG. 1 is a perspective view of an example of a construction system according to the present invention.

With reference to FIG. 1, a construction system 1 according to the present invention may be in the form of a timber dwelling, although any other form of edifice can be envisaged. This dwelling comprises in particular a floor, walls and a roof rake. They may for example be formed from wood. Openings may be formed in a plurality of these elements, for example on one of the walls, in order to place a window thereon.

In this example, a first wall comprises a set of construction elements including the construction element 10. A second wall itself comprises a set of construction elements including the element 20. This division into construction elements relates to the limits of sizing of standard transports, of the lifting means in construction and the industrial tools for manufacturing these elements.

Figure 2:
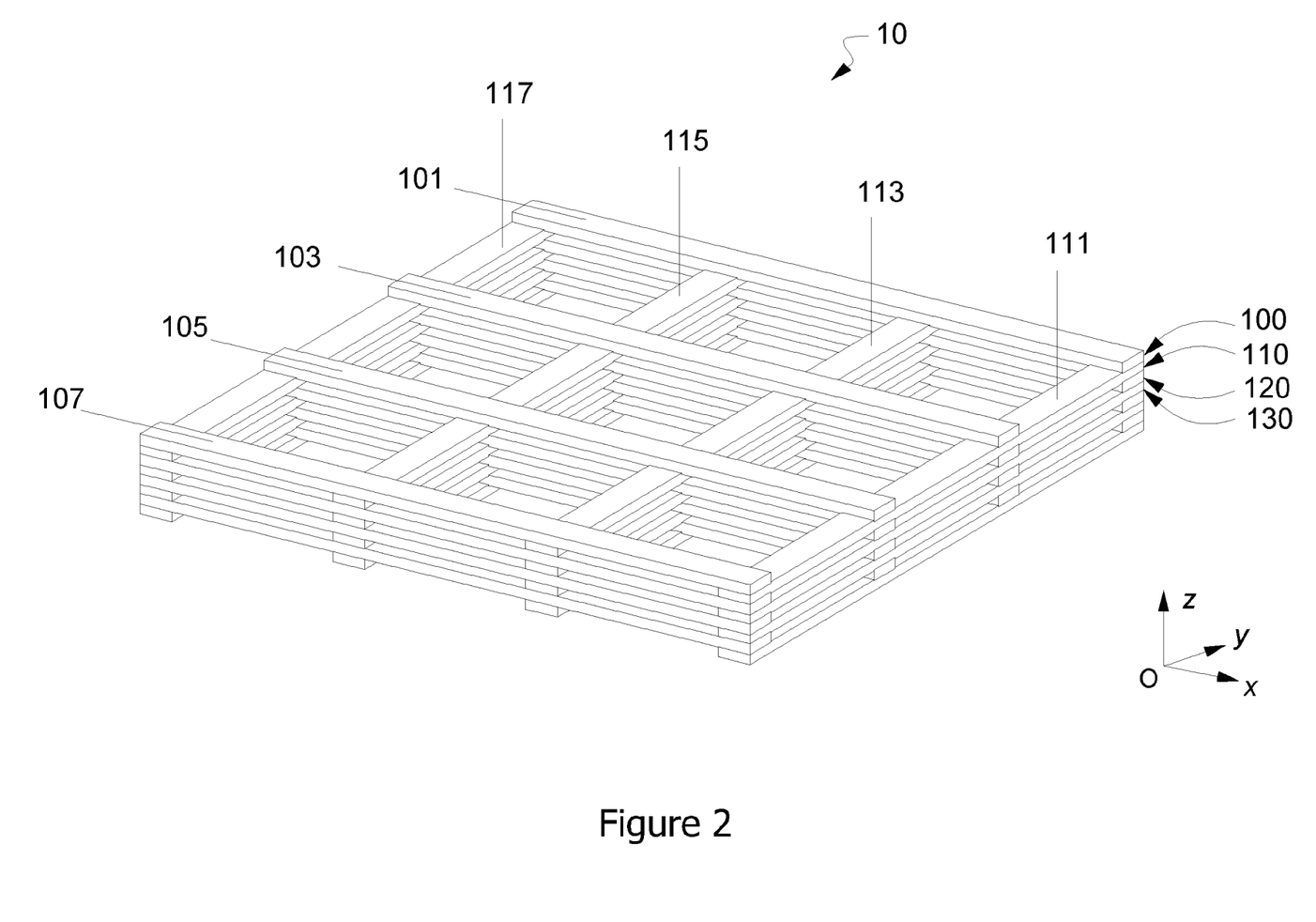
FIG. 2 is a perspective view of one of the elements constituting the construction system of FIG. 1, according to the present invention.

The construction element 10 is shown in more detail in FIG. 2. The first construction element 10 in FIG. 2 comprises a set of eight superimposed plies, the first four of which are the plies 100, 110, 120 and 130. The configuration of the plies is said to be "crossed boards". A different number of plies may be provided, for example greater than three, preferably between five and fifteen, preferably between seven and twelve. The determination of the optimum number of plies is an arbitration between the thermal performance of the construction element 10, its strength (which is better, the more plies there are), its total thickness (which, usually, must not exceed a certain limit), its cost and its application (interior or exterior walls, floors or roofs, etc.).

Each of the plies 100, 110, 120 and 130 comprises wooden structural boards. The first ply 100 comprises four boards 101, 103, 105 and 107 parallel and oriented along the axis (Ox), The second ply 110 comprises four boards 111, 113, 115 and 117 parallel and oriented along the axis (Oy). The third ply 120 comprises four boards parallel and oriented along the axis (Ox). The fourth ply 130 comprises four boards parallel and oriented along the axis (Oy). In this "crossed boards" configuration, the plies 100, 110, 120 and 130 consist alternately of parallel boards along the axis (Ox) and parallel boards along the axis (Oy). The structural boards of two adjacent plies are orthogonal to each other and form together a grid covering the whole of the construction element 10.

The boards of the same ply may be oriented in the same direction and are spaced apart from one another so as to cover the whole of the construction element 10 substantially uniformly. These boards are oriented so that the boards of one ply are orthogonal to the boards of an adjacent ply, but a different angle between these boards could also be provided. Moreover, the number of structural boards for each ply results from an arbitration between economy of wood on the one hand and the strength and size of the construction element on the other hand.

A functional board (not shown) may be interposed between two structural boards of the same ply. This functional board is intended to fulfil a specific function, different from that of the structural boards, in other words it does not serve to support the construction element and is not formed from solid wood (but it may be formed from certain types of insulator, such as wood wool, which are not recognised as having load-bearing properties). The choice of its constituent material depends on the function that it is wished to confer on it. This function may relate to thermal and/or sound insulation, to thermal inertia, to fire resistance or to any function considered to be appropriate. In addition, economy of wood requires supplementing the absence of the material in structural boards with functional boards and improving the associated capacity all the more.

Figure 3:
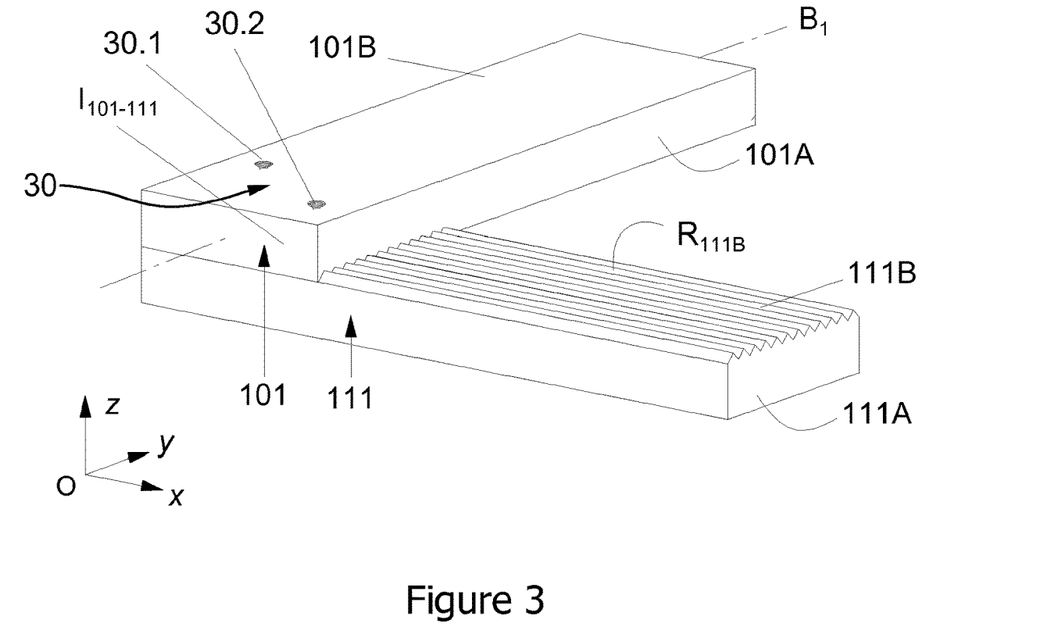
FIGS. 3 and 4 are perspective views of two structural boards of a construction element, according to a first embodiment of the present invention.

As can be seen more precisely in FIG. 3, the structural board 101 has in particular two faces 101A and 101B. The structural board 111 also has in particular two faces, one of which is referenced 111B. When the plies 100 and 110 are placed one on top of the other, the structural boards 101 (depicted in white) and 111 (grooved) come into contact at their respective faces 101A and 111B, which form a contact interface situated in the plane (Oxy).

Figure 4:
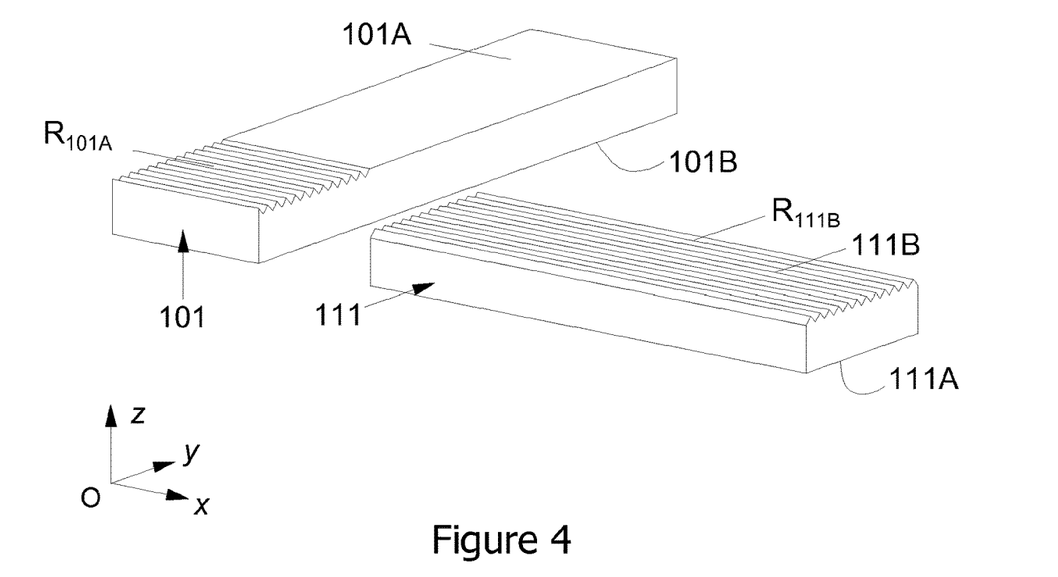

FIGS. 3 and 4 depict more precisely the contact between two structural boards 101 and 111 of two adjacent plies 100 and 110, according to a first embodiment of the present invention.

In FIG. 3, the structural board 101 has a bottom face 101A (not visible) and a top face 101B. Likewise, the structural board 111 has a bottom face 111A (not visible) and a top face 111B. When the plies 100 and 110 are superimposed, the structural boards 101 and 111 come into contact at a contact interface $I_{101-111}$ situated in the plane (Oxy).

As can be seen in FIG. 4, the bottom face 111B of the board 111 is provided with a set of grooved patterns $R_{111B}$, over the entire longitudinal extent thereof, that is to say along the axis (Oy). The top face 101A of the board 101 is also provided with a set of grooved patterns $R_{101A}$, but only over part of the longitudinal extent thereof, along the axis (Oy). On the faces 101A and 111B, the grooved patterns $R_{101A}$ and $R_{111B}$ are complementary and form a series of rectilinear grooves parallel to each other. These patterns are disposed on the faces of the boards so as to cover the contact interface $I_{101-111}$. Their forms and dimensions are substantially identical, so that these grooved patterns are substantially complementary to each other.

Thus, when the boards 101 and 111 are placed one on top of the other, the grooved patterns $R_{101A}$ and $R_{111B}$ at least partially fit in each other, which makes it possible to form an obstacle to the sliding of the two boards 101 and 111 with respect to one another along a first locking axis $B_1$, parallel to the axis (Oy), orthogonal to the axis of the grooves (Ox), in the plane (Oxy) of the contact interface $I_{101-111}$. This obstacle is obtained without disposing any glue at the contact interface $I_{101-111}$, thus avoiding the drawbacks of glue, in particular from the ecological, mechanical and industrial point of view. Moreover, these grooved patterns can serve as references for the fitting together of the boards, in particular in the context of automated assembly.

In this example, the grooved patterns have a cross section with a triangular shape, but other shapes of grooved patterns are possible, in particular shapes with a non-triangular cross section. For example, a square, rectangular or semicircular cross section may be provided.

For the grooved patterns $R_{101A}$ and $R_{111B}$ to remain at least partially fitted in one another, at least one holding system is provided for holding the boards against one another at the contact interface. In the example in FIGS. 3 and 4, the holding system comprises two members 30.1 and 30.2, distributed at the contact interface $I_{101-111}$, in the form of a metal threaded rod that will be described in more detail below. The holding system thus does not comprise any glue, still in order to avoid—or at least limit—the quantity of glue present in the construction element 10. This holding system provides a holding of the boards 101 and 111 against one another along the axis (Oz) orthogonal to the plane (Oxy) of the contact interface $I_{101-111}$. The metal threaded rods have several advantages, including the speed of penetration and the resistance to pulling away in the wood. Holding can therefore be provided more easily, with greater reliability and minimising the risk of splitting the wood.

Figure 5:
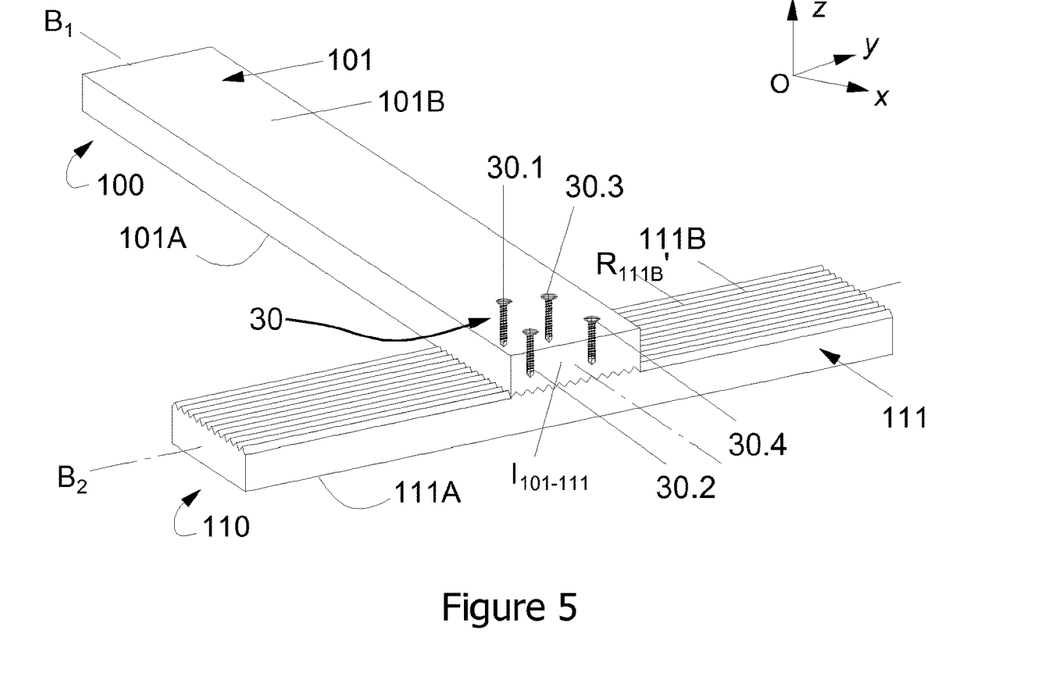
FIGS. 5 and 6 are perspective views of two structural boards of the construction element according to a second embodiment of the present invention.
Figure 6:
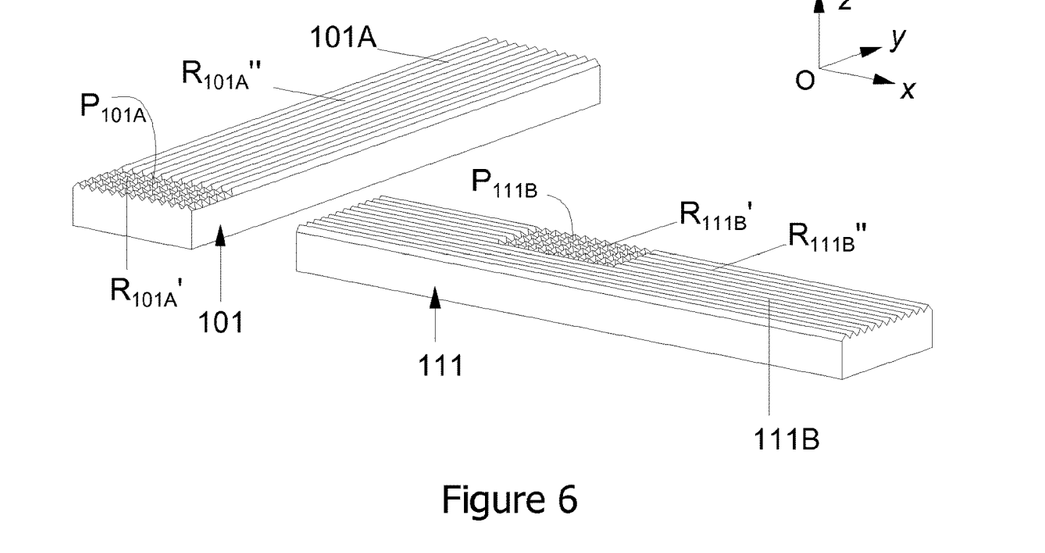

FIGS. 5 and 6 depict more precisely the contact between two structural boards 101 and 111 of two adjacent plies 100 and 110, according to a second embodiment of the present invention.

In FIG. 5, it can be seen that the general structure and the superimposition of the structural boards 101 and 111 are similar to those in FIG. 3.

In FIG. 6, it can be seen more precisely that the face 111B of the board 111 is provided firstly with grooved patterns $R_{111B}''$, in the form of parallel grooves disposed over the entire longitudinal extent of the board, along the axis (Ox), and secondly supplementary grooved patterns $R_{111B}'$, in the form of parallel grooves disposed only over part of the transverse and longitudinal extent of the board 111, along the axis (Oy), that is to say orthogonal to the grooves $R_{111B}''$. Conversely, the face 101A of the board 101 is provided firstly with the grooved patterns $R_{101A}'$, in the form of parallel grooves disposed solely over part of the longitudinal extent of the board 101, along the axis (Ox), and secondly supplementary grooved patterns $R_{101A}''$, in the form of parallel grooves disposed over the entire longitudinal extent of the board, along the axis (Oy), that is to say orthogonal to the grooves $R_{101A}'$.

In this configuration, the grooved patterns $R_{101A}'$, $R_{101A}''$, $R_{111B}'$, $R_{111B}''$ are arranged so as to form an obstacle to the sliding of the first board and the second board with respect to one another along two locking axes $B_1$ and $B_2$ non-parallel and situated in the plane (Oxy) of the contact interface $I_{101-111}$: the first locking axis $B_1$, parallel to the axis (Ox), orthogonal to the grooves $R_{111A}'$ and $R_{111B}''$, and the second locking axis $B_2$, parallel to the axis (Oy), orthogonal to the grooves $R_{111A}''$ and $R_{111B}'$. The obstacle to the sliding of the boards 101 and 111 with respect to one another is thus obtained in the whole of the plane of the contact interface $I_{101-111}$, without requiring any glue.

In this configuration, the part of the contact interface $I_{101-111}$ that comprises the grooved patterns $R_{101A}'$, $R_{101A}''$, $R_{111B}'$ and $R_{111B}''$ is in the form of spikes $P_{101A}$ and $P_{111B}$, the ends of which may or may not be sharp according to circumstances, in particular according to the production conditions. In FIG. 6, it can be observed that these spikes form a matrix of barbs, the shape of which is substantially that of a pyramid with a quadrilateral base, in particular with a square base. This form of barb proves easier to machine. It will be understood that other forms of pattern can be envisaged, for example with a triangular base, or with a parallelogram base, in particular in the case where the axes of the grooves are not orthogonal.

In FIG. 5, it can be seen that the boards are held together along the axis (Oz) by a holding system comprising four members 30.1, 30.2, 30.3 and 30.4, all in the form of metal threaded rods. A different number and distribution of these members can nevertheless be envisaged.

It will be understood that, in order to ensure locking of the boards 101 and 111, it suffices for the grooved patterns $R_{101A}'$, $R_{101A}''$, $R_{111B}'$ and $R_{111B}''$ to be disposed over at least part of the contact interface $I_{101-111}$. Nevertheless, from the mechanical point of view, the locking of the boards will be all the better if the faces are provided with grooved patterns over the entire contact interface $I_{101-111}$. Furthermore, from the industrial point of view, the grooved patterns can be produced by machining of the faces 101A and 111B. In this case, the machining can be carried out more easily, cleanly and rapidly over the entire length of the boards, rather than over only part thereof.

In the above examples, the boards 101 and 111 are orthogonal to one another and the locking axes $B_1$ and $B_2$ are themselves orthogonal. Other examples may be provided in which the boards 101 and 111 are not orthogonal but inclined with respect to one another, for example by an angle of around 45°. The invention covers more generally any possible inclination between two structural boards.

In order to reinforce the mechanical connection between the grooved patterns of the boards 101 and 111, these are formed from wood from broad-leafed trees. This type of wood has greater density, which makes the grooved patterns—of small dimensions and therefore potentially fragile—stronger and less liable to be pulled away under the effect of mechanical forces. Furthermore, the strength of the assembly having been improved, the invention makes it possible to use wood from broad-leafed trees with smaller cross sections and lower quality, which affords not only savings when the raw material is purchased, but also re-use of this wood usually intended to be burnt in order to produce energy.

According to the present invention, before being held together by the members 30.1 to 30.4, the grooved patterns $R_{101A}'$, $R_{101A}''$, $R_{111B}'$ and $R_{111B}''$ are first of all pressed against each other. This prior pressing may be provided by various means within the capability of a person skilled in the art, for example by applying a weight to the top board. In the particular context of boards with grooved patterns, this makes it possible to make the grooved patterns fit in one another more precisely before the members are applied, which improves the precision of assembly. The transmission of the forces and the mechanical strength of the assembly are also improved because of this prior pressing. A suitable pressure for achieving this pressurisation of the boards may be greater than 75 kPa. By way of example, with a contact interface with a square shape of 12 centimetres by 12 centimetres, a pressure of 75 kPa amounts to applying a mass of around 110 kilograms to this interface.

If this pressure increases, in particular if it exceeds a threshold, which may for example be around 150 kPa, the grooved patterns may be slightly deformed. This deformation assists contact and cooperation of the grooved patterns with each other, which improves accordingly the transmission of forces between the boards. With a contact interface with a square shape of 12 centimetres by 12 centimetres, a pressure of 150 kPa amounts to applying to this interface a mass of around 220 kilograms.

Figure 7:
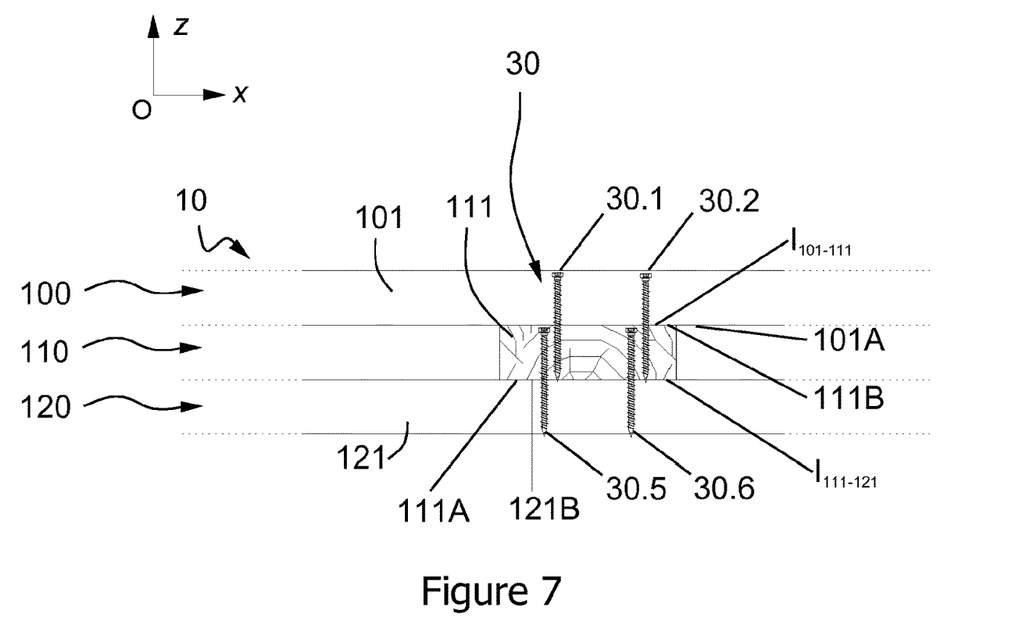
FIGS. 7 and 8 are views in cross section of three structural boards of a construction element, according to a third embodiment of the present invention.
Figure 8:
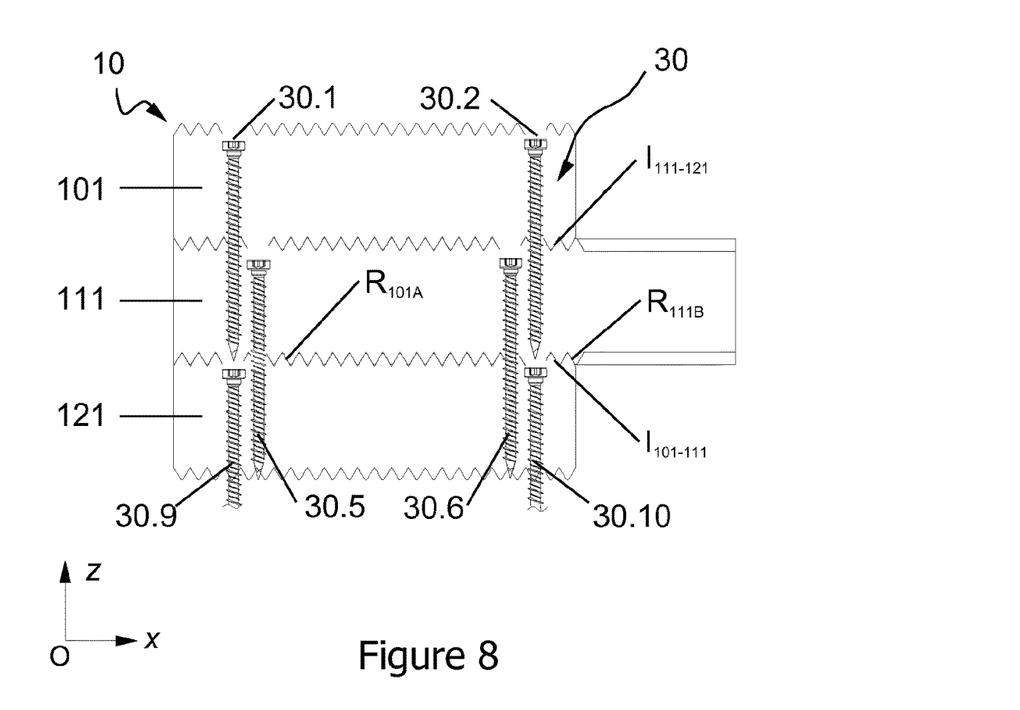

FIGS. 7 and 8 show the detail of an arrangement of the members in the case where it is a question of holding three superimposed plies together. The three boards in question are designated by the references 101, 111 and 121, are superimposed in pairs, that is to say the boards 101 and 111 are superimposed at the contact interface $I_{101\text{-}111}$ and the boards 111 and 121 are superimposed at the contact interface $I_{111\text{-}121}$. This arrangement may be combined with the previous embodiments. It may in particular be adapted to a greater number of plies and superimposed boards.

In FIG. 7, the holding system comprises a first set of members—or threaded rods—30.1 and 30.2 passing through the boards 101 and 111 at the contact interface $I_{101\text{-}111}$ and a second set of members—or threaded rods—30.5 and 30.6 passing through the boards 111 and 121 at the contact interface $I_{111\text{-}121}$. In this way, the two sets of members pass through the intermediate board 111, which ensures continuity in the assembly and holding of the boards together. For the board 111 thus to be doubly passed through, the members 30.1 (and respectively 30.2) are offset with respect to the members 30.5 (and respectively 30.5) in the plane (Oxy) of the two contact interfaces.

This configuration makes it possible to avoid a single member (for example the member 30.1) passing through all the boards 101, 111 and 121. It will be understood that, if this is still possible in a configuration with three plies, the use of the same threaded rod for passing through a configuration for example with seven or eight plies would require a longer rod, and thicker, which would be more expensive and less precise for assembling the boards. On the other hand, with members thus offset, these can be short and the multitude of members locally increases the interactions with the grooved patterns, which improves the transmission of forces.

In FIG. 8, the construction element 10 comprises a number of plies greater than three. Then additional members 30.9 and 30.10 (as well as two other members not shown in the figures) are perforated, in order to hold the board 121 with the boards of the plies situated above it. As can be seen, the members 30.1 (and respectively 30.2) are aligned with the members 30.9 (and respectively 30.10).

Figure 12:
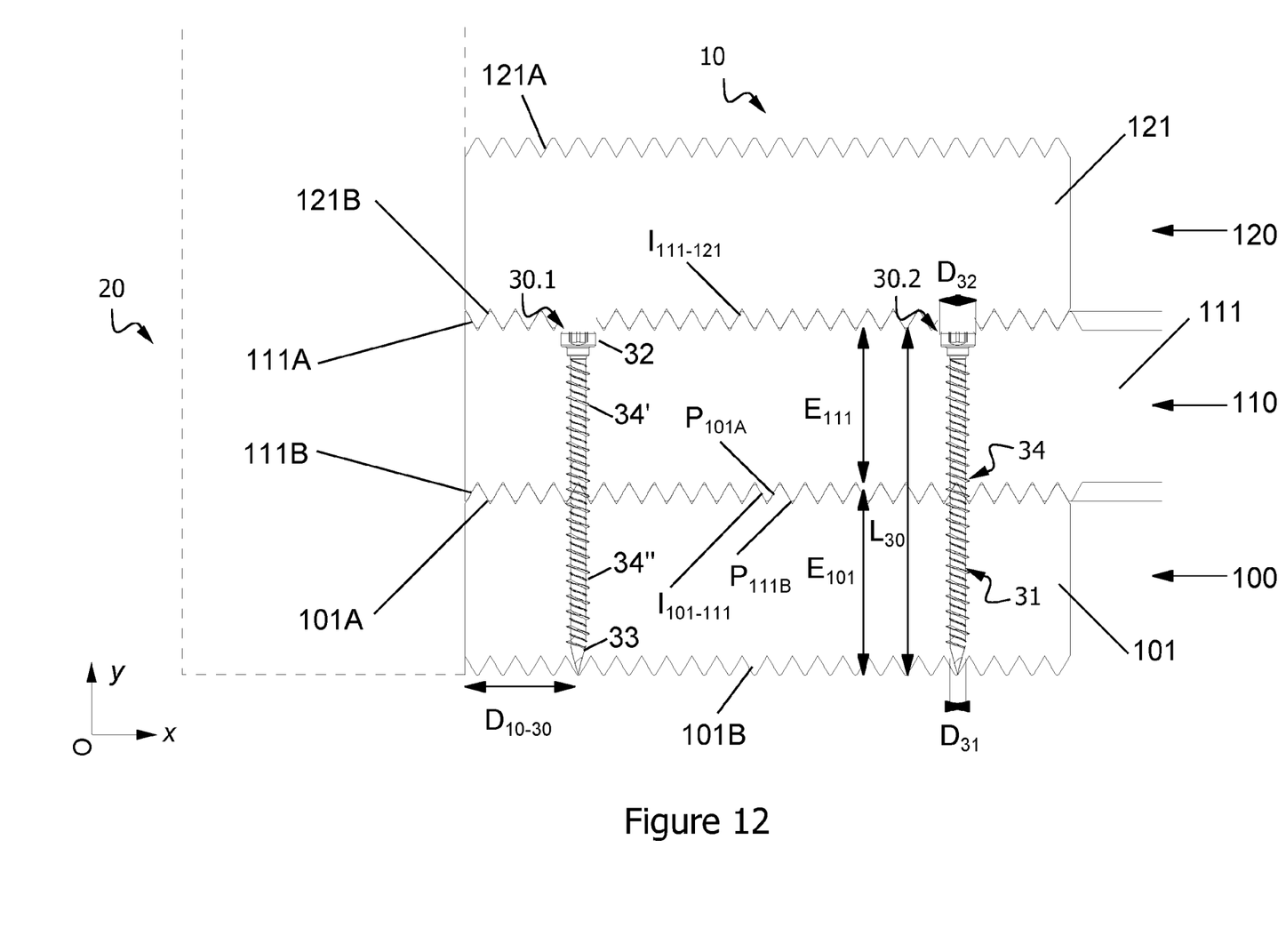
FIG. 12 is a detailed view in cross section of a construction element according to an embodiment of the present invention.

The members depicted in FIGS. 7 and 8 are intended to pass through two plies and therefore two boards. In this case, their respective lengths $L_{30}$ are substantially equal to the total thickness of the two boards $E_{101}$ and $E_{111}$ (depicted in FIG. 12) that they pass through and hold together. This has the effect of allowing penetration of the members over the entire thickness of the boards, which increases the proportion of material acted on and in fact improves the resistance to pulling away of the member in the wood.

Alternatively, provision could be made for these members to pass through a larger number of plies and boards. In this case, it remains preferable, according to the invention, that at least one first member passes through a first part of the plies and that a second member passes through a second part of the plies, the first and second parts of the plies having at least one ply in common, the first and second members being at least slightly offset.

Figure 9:
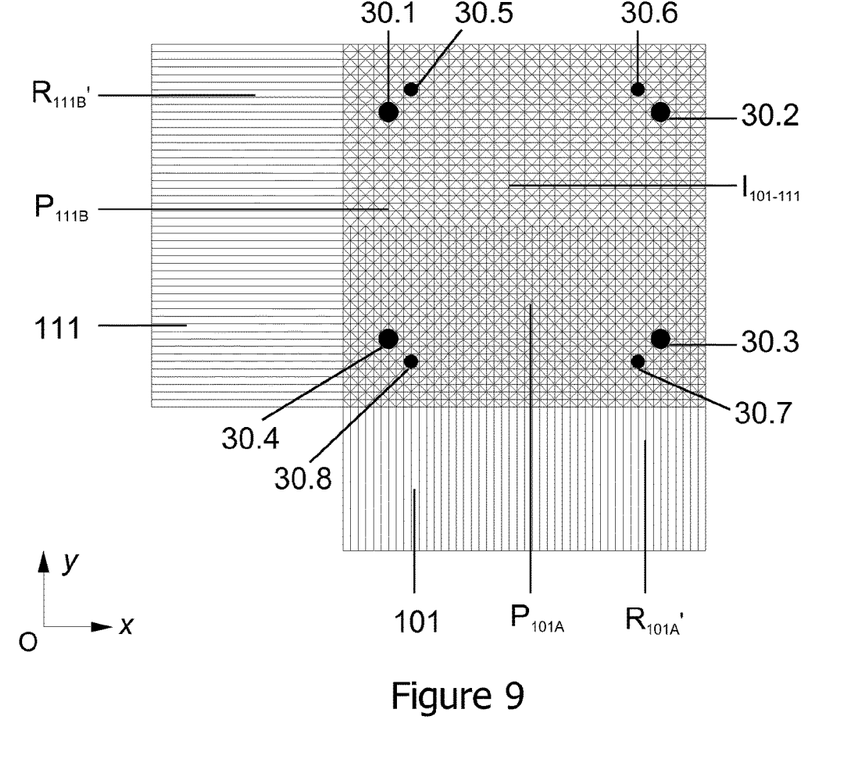
FIG. 9 is a plan view of a contact interface between two boards.

FIG. 9 depicts an example of distribution of the various members of the holding system on the contact interface between a plurality of structural boards.

In this configuration, the construction element 10 is formed by at least three superimposed plies, the boards 101 and 111 of which can be seen (the board 121 not being depicted for reasons of clarity). The holding system 30 is provided with a plurality of sets of members, including a first set of four members 30.1, 30.2, 30.3 and 30.4 and a second set of four members 30.5, 30.6, 30.7 and 30.8. The four members 30.1 to 30.4 are provided for holding the boards 101 and 111 against one another at the contact interface $I_{101\text{-}111}$. The four members 30.5 to 30.8 are provided for holding the boards 111 and 121 (not shown) against one another at the contact interface $I_{111\text{-}121}$. This configuration therefore repeats the principle of a holding of two boards by four members (as shown in FIG. 5) and the principle of providing members for holding together only some of the boards (as illustrated by FIGS. 7 and 8). The members 30.1 to 30.8 are therefore in the form of metal threaded rods. As can be seen in FIG. 9, the members of the first set and those of the second set are slightly offset, to enable these members to pass through a common board, in this case the board 111, without forming an obstacle.

In order to achieve optimal holding, for each contact interface, the four members of the same set are distributed in the vicinity of the edges of the interface, while ensuring that a separation from the edge is complied with in order to avoid splitting the wood. Thus it is preferred to dispose the members 30.1 to 30.4 depicted in FIG. 9 at a distance $D_{10\text{-}30}$ from the edge of the interface $I_{101\text{-}111}$ (depicted in FIG. 12) that lies between 1.5 and 4 centimetres.

Figure 10A:
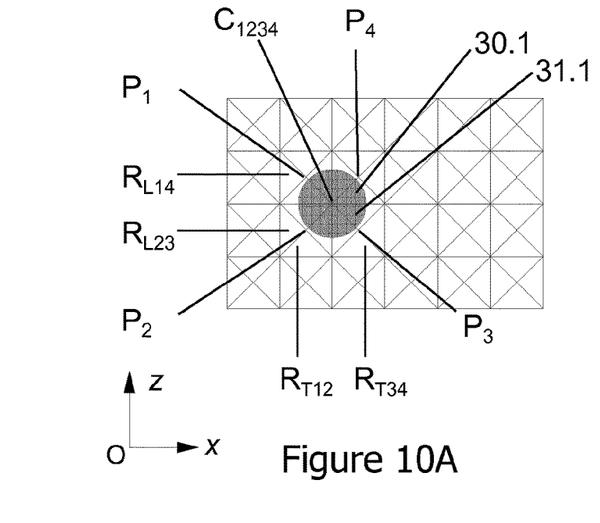
FIGS. 10A and 10B are close views of the interface of FIG. 9.
Figure 10B:
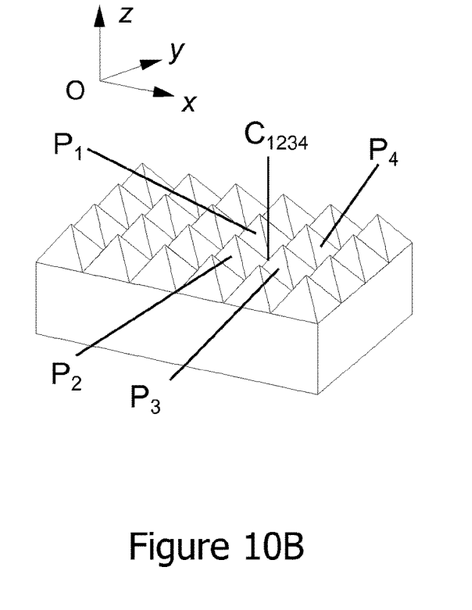

FIGS. 10A and 10B show more precisely the positioning of a holding system at the contact interface. As can be seen, the grooved patterns form a set of barbs P. The member 30.1 that is depicted therein is positioned in a hollow of the grooved patterns, designated here by the reference $C_{1234}$, at the intersection of the grooves $R_{T12}$, $R_{T34}$, $R_{L14}$ and $R_{L23}$. In this case, the diameter of the rod 31.1 of the member 30.1 is such that the extent of the member 30.1 on the contact interface $I_{101\text{-}111}$ is limited to the four patterns $P_1$, $P_2$, $P_3$ and P$_4$. The member 30.1 therefore covers only two grooved patterns in each axis, namely the patterns R$_{L23}$ and R$_{L14}$ in the axis (Ox) and the pattern R$_{T12}$ and R$_{T34}$ in the axis (Oy). It therefore covers no more than four grooved patterns.

Figure 11A:
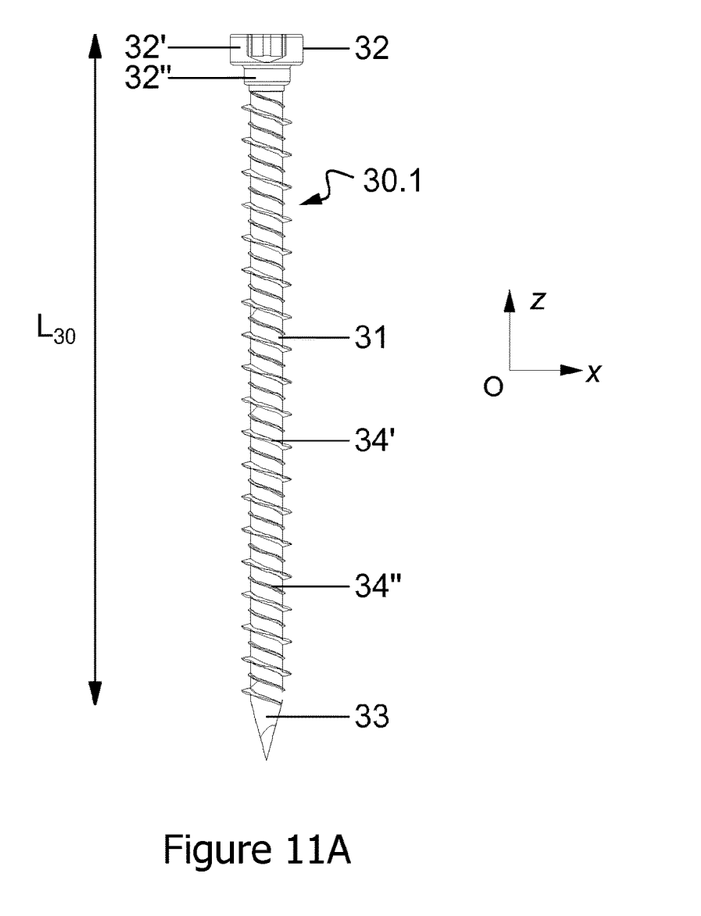
FIGS. 11A and 11B are respectively a side view and a plan view of a member of a holding system according to one embodiment of the invention.
Figure 11B:
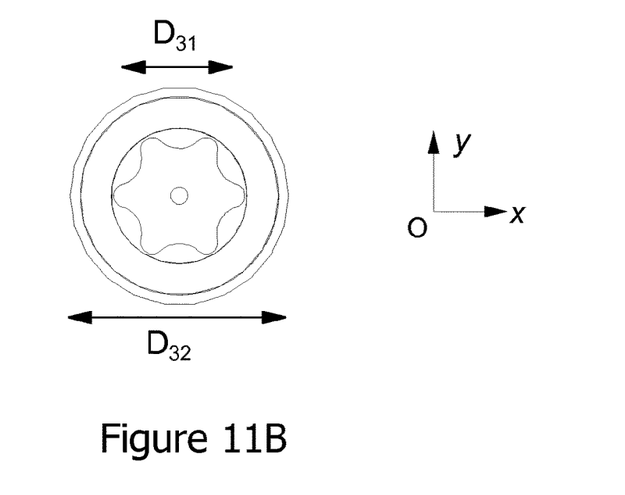

FIGS. 11A and 11B show an example of a metal threaded-rod member 30.1 of the holding system 30, which can be applied to all the members 30.1, 30.2 et seq. that have already been described.

The member 30.1 of length L$_{30}$ comprises a metal threaded rod 31 with a roughly cylindrical shape. This rod comprises at the opposite ends thereof a head 32 and a spike 33. The head 32 is formed by two subparts 32' and 32" with different diameters. The top part 32' is provided with a recess complementary to a screwing tool. The rod 31 is provided with a thread, which may be a single or double thread.

In the configuration in FIG. 11A, the thread on the rod 31 comprises two threads 34' and 34", interleaved and with different diameters. The advantage of this thread relates to the fact that the performance of a thread depends on its pitch and its diameter. The larger the pitch of the thread, the more quickly the rod penetrates the wood. The larger the thread diameter, the more it works the wood in shearing. The configuration with two interleaved threads with different diameters ensures the local working of the wood in two different shear planes, which increases the mechanical strength of the assembly and reduces the penetration time of the screw.

It is nevertheless important that the thread should remain sufficiently narrow, in particular for boards made from wood from broad-leafed trees. Thus the ratio between the largest diameter of the thread and the diameter of the rod is preferentially between 1.5 and 1.7.

The invention also proposes a method for manufacturing a construction element 10 as described above. This method involves starting from structural boards already provided with grooved patterns on their respective contact interfaces. Alternatively, provision may be made for providing these boards with grooved patterns, for example by machining their faces intended to be superimposed.

According to the invention, the boards 101 and 111 already provided with grooved patterns R$_{101A}$ and R$_{111B}$ are superimposed so that these grooved patterns come into contact with one another at the contact interface I$_{101-111}$. In this regard, advantage can be taken of the complementary shape of the grooved patterns R$_{101A}$ and R$_{111B}$ in order to bring them together until they fit together at least partly, which makes it possible to perform this superimposition step with high precision.

Subsequently, the boards 101 and 111 are put under pressure, that is to say pressed against one another, at the contact interface I$_{101-111}$. The grooved patterns R$_{101A}$ and R$_{111B}$ are thus pre-pressed before actually being held together. This pressurisation step can be achieved by various means within the capability of a person skilled in the art, for example by applying a weight on the top board. Suitable pressure may be greater than 75 kPa, as already indicated above. According to the pressure level, the grooved patterns will be fitted together (which is not, most of the time, allowed by a simple superimposition) or even crushed and thus slightly deformed, which improves the transmission of forces between the boards thus superimposed and the mechanical strength of the assembly.

Finally, the boards 101 and 111 thus superimposed and put under pressure can be held against one another by means of a holding system 30 according to the invention, in particular one or more threaded metal rods disposed at the contact interface I$_{101-111}$ and passing through the thickness of the boards. The boards are then held against one another, not only with high positioning precision but also with better transmission of forces between them.

This method may be repeated in order to assemble all the boards and all the plies of the same construction element 10, thus allowing complete fabrication.

Naturally, the present invention is not limited to the examples and embodiments described and depicted, but is capable of numerous variants accessible to a person skilled in the art. In particular the various forms of connectors that have been described above—as well as other forms within the capability of a person skilled in the art on reading the present description—may be combined within the same construction system, according to the advantages of each and the specific requirements of the construction system.

The invention claimed is:

1. A method for manufacturing a construction element comprising the following steps:
   superimposing a first structural board having a first set of grooved patterns on an upper face and a second structural board having a second set of grooved patterns on a lower face so that the first set of grooved patterns on the upper face of the first structural board and the second set of grooved patterns on the lower face of the second structural board are in contact with each other at a contact interface, wherein the second set of grooved patterns are at least substantially complementary with the first set of grooved patterns;
   before holding the first structural board and the second structural board together, putting the first structural board and the second structural board under pressure against each other with a pressure of at least 75 kPa such that the grooved patterns are at least partially warped; and
   holding the first structural board and the second structural board together by a holding system comprising at least one metal threaded-rod member at least partially passing through the first structural board and the second structural board at the contact interface so as to form an obstacle to the sliding of the first board and of the second board with respect to one another along at least one axis.

2. The manufacturing method according to claim 1, wherein the grooved patterns are arranged so as to form an obstacle to the sliding of the first board and the second board with respect to one another along at least two non-parallel axes.

3. The manufacturing method according to claim 2, wherein the grooved patterns comprise a first series of grooves parallel to each other, and a second series of grooves parallel to each other but not parallel to the grooves in the first series.

4. The manufacturing method according to claim 3, wherein at least some of the grooved patterns are in the form of a matrix of barbs, the shapes of which are substantially those of a pyramid with a quadrilateral base.

5. The manufacturing method according to claim 1, wherein the metal threaded-rod member comprises a threaded rod provided with a head and a spike disposed at opposite ends of the rod.

6. The manufacturing method according to claim 1, wherein the metal threaded-rod member has a roughly cylindrical shape.

7. The manufacturing method according to claim 1, wherein the metal threaded-rod member comprises at least two threads interleaved and with different diameters.

8. The manufacturing method according to claim 1, wherein the holding system comprises four metal threaded-rod members distributed over the whole of the contact interface and at least partially passing through the first structural board and the second structural board at the contact interface.

9. The manufacturing method according to claim 8, wherein the distance that separates at least one of the members from the edge of the contact interface is between 1.5 and 4 centimeters.

10. The manufacturing method according to claim 1, wherein the construction element comprises at least three wooden structural boards, at least some of the faces of which are in pairs superimposed at respective contact interfaces, wherein the holding system comprises a first set of metal threaded-rod members at least partially passing through a first part of the boards and a second set of metal threaded-rod members at least partially passing through a second part of the boards, the first and second board parts having at least one board in common, the members being offset with respect to each other in the planes of the contact interfaces of the boards.

11. The manufacturing method according to claim 10, wherein the length of at least one of the metal threaded-rod members is substantially equal to a total thickness of either the first part of the boards or the second part of the boards.

12. The manufacturing method according to claim 1, wherein at least one of the members is positioned in a hollow of the grooved patterns.

13. The manufacturing method according to claim 10, wherein a diameter of at least one of the members is configured so as to cover no more than four grooved patterns.

14. The manufacturing method according to claim 1, wherein the first structural board and the second structural board are put under pressure against each other with a pressure of at approximately 150 kPa.

15. The manufacturing method according to claim 1, further comprising:
- at least partially providing the upper face of the first structural board with the first set of grooved patterns; and
- at least partially providing the lower face of the second structural board with the second set of grooved patterns.

* * * * *